United States Patent
Bono et al.

(10) Patent No.: US 10,007,671 B1
(45) Date of Patent: Jun. 26, 2018

(54) DATA STORAGE SYSTEM EMPLOYING SPACE RECLAIM APPROXIMATION

(71) Applicant: EMC IP Holding Company LLC, Hopkinton, MA (US)

(72) Inventors: Jean-Pierre Bono, Westborough, MA (US); Xiaoye Jiang, Shrewsbury, MA (US); William C. Davenport, San Diego, CA (US); Philippe Armangau, Acton, MA (US); Yingchao Zhou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 15/085,289

(22) Filed: Mar. 30, 2016

(51) Int. Cl.
*G06F 17/00* (2006.01)
*G06F 17/30* (2006.01)
*G06F 3/06* (2006.01)

(52) U.S. Cl.
CPC ...... *G06F 17/30088* (2013.01); *G06F 3/0608* (2013.01); *G06F 3/0647* (2013.01); *G06F 3/0652* (2013.01); *G06F 3/0683* (2013.01); *G06F 17/30138* (2013.01)

(58) Field of Classification Search
CPC ........... G06F 17/30088; G06F 2201/84; G06F 17/3023; G06F 11/1446; G06F 11/1435; G06F 17/30182; G06F 3/0643
USPC .. 707/695, 639, 822, 828, 999.203, 999.205
See application file for complete search history.

(56) References Cited

U.S. PATENT DOCUMENTS

| | | | |
|---|---|---|---|
| 6,968,351 B2 | 11/2005 | Butterworth | |
| 2003/0204597 A1* | 10/2003 | Arakawa | G06F 3/0605 709/226 |
| 2007/0180168 A1* | 8/2007 | Chikusa | G06F 3/0617 710/74 |
| 2008/0104347 A1* | 5/2008 | Iwamura | G06F 11/2076 711/162 |
| 2009/0249104 A1* | 10/2009 | Ikeda | G06F 1/3268 713/324 |
| 2011/0029748 A1* | 2/2011 | Nakamura | G06F 11/1451 711/162 |
| 2013/0054528 A1* | 2/2013 | Saika | G06F 3/0608 707/638 |
| 2016/0364268 A1* | 12/2016 | Okada | G06F 13/10 |
| 2018/0004676 A1* | 1/2018 | Imazaki | G06F 12/109 |

* cited by examiner

*Primary Examiner* — Dung K Chau
(74) *Attorney, Agent, or Firm* — BainwoodHuang (57) ABSTRACT

A method of conditionally truncating a volume file in a data storage system includes identifying counts of categories of data blocks of the volume file, including (1) a first count of blocks owned by the volume file and located after the target end-of-file, (2) a second count of blocks located after the target end-of-file and requiring relocation to before the target end-of-file, and (3) a third count of blocks being free and owned by the volume file and located before the target end-of-file. An approximation of space to be freed is generated as a difference between the first count and a value expressing an excess of the second count over the third count. When the approximation is above a predetermined threshold, then the volume file is truncated to the target end-of-file, and otherwise truncating is refrained from.

18 Claims, 6 Drawing Sheets

DATA STORAGE SYSTEM EMPLOYING SPACE RECLAIM APPROXIMATION

BACKGROUND

The present invention is related to the field of data storage systems, and in particular data storage systems employing internal file systems for managing the storage of client data.

SUMMARY

A method is disclosed of operating a data storage system having physical storage devices and one or more storage processors executing computer program instructions to define an upper file system, a lower file system, and an intermediate logical volume. The intermediate logical volume is viewed as an underlying storage volume by the upper file system and stored as a set of volume files of the lower file system. The volume files include a primary volume file for a current version of the storage volume and one or more secondary volume files for snapshot copies of the storage volume at past points in time. The method is directed to conditionally truncating the primary volume file to a target end-of-file based upon an approximation of an amount of storage space to be returned to an underlying storage pool.

The method includes identifying respective counts of categories of data blocks of the primary volume file, including (1) a first count of blocks being owned by the primary volume file and located after the target end-of-file, (2) a second count of blocks being located after the target end-of-file and requiring relocation to before the target end-of-file, and (3) a third count of blocks being free and owned by the primary volume file and located before the target end-of-file.

The method further includes generating an approximation of space to be freed as a difference between the first count and a value expressing an excess of the second count over the third count. When the approximation is above a predetermined threshold, then the primary volume file is truncated to the target end-of-file, and otherwise truncating is refrained from.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
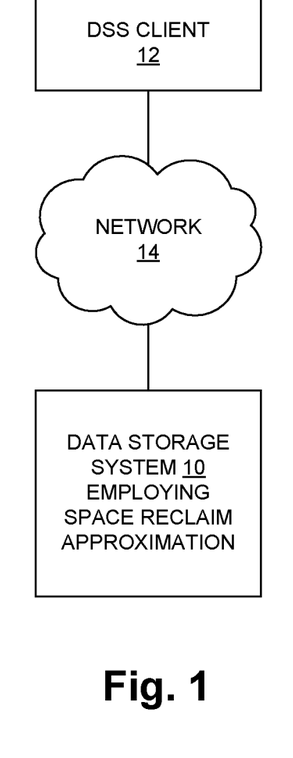
FIG. 1 is a block diagram of a computer system.

FIG. 1 shows a computer system having a data storage system 10 coupled to one or more data storage system (DSS) clients 12 by a network 14. In a typical case a DSS client 12 is a host computer such as a server computer executing one or more application programs (applications) for which the secondary storage (block or file) is maintained by the data storage system 10, with the network 12 conveying data storage requests and responses, as well as associated data. For example, a DSS client 12 performs a write operation to a block-oriented storage device by issuing a write request that specifies the device, the starting logical address, and the length, as well as the associated write data. The network 12 conveys the write request and write data to the data storage system 10, which stores the write data on the identified device beginning at the specified logical address. A DSS client 12 performs a read operation to a block-oriented device by issuing a read request that specifies the device, the starting logical address, and the length. The network 12 conveys the read request to the data storage system 10, which obtains the data from the specified device beginning at the specified logical address and returns the data to the DSS client 12 via the network 14. As explained more below, the data storage system 10 may present storage resources to the DSS clients 12 in alternative ways, such as in the form of a network-level or distributed file system, or as virtual volumes or similar virtualized storage containers that are understood by DSS clients 12 hosting virtual machines, such as ESX® hosts (servers) or XEN® hosts (servers).

As indicated at 10, the data storage system 10 employs a certain technique of approximating the amount of space that can be freed by a space reclaim process performed on an internal file system. Details and advantages of this technique are described below.

Figure 2:
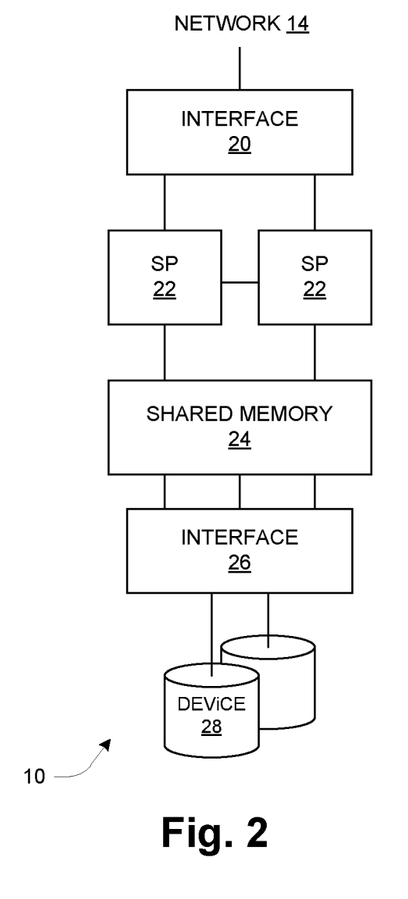
FIG. 2 is a hardware-oriented block diagram of a data storage system.

FIG. 2 is a block diagram of the data storage system 10 from a hardware perspective. It includes an interface 20 to the network 14, a pair of storage processors (SPs) 22, shared memory 24, and an interface 26 to secondary storage devices (DEVICE) 28, such as magnetic disks, Flash drives, etc. The interface 20 may include one or more network adapters such as a FibreChannel adapter, Gigabit Ethernet adapter, etc., and the interface 26 may similarly include storage-oriented adapters such as FibreChannel adapters etc. Each storage processor 22 executes software causing the storage processor 22 to present logical or virtualized storage resources to the network 14 and DSS clients 12, employing the devices 28 for the underlying physical storage. The logical or virtualized storage resources may include either or both block-oriented devices (e.g., logical storage units (LUNs), virtual volumes (VVOLS), etc.) and/or client-visible file systems (e.g., NFS, CIFS, etc.) The shared memory 24 may be used for one or more device caches, also referred to as a "storage cache", for caching data of the devices 28. Further details of the structure and operation of the data storage system 10 are provided below.

Figure 3:
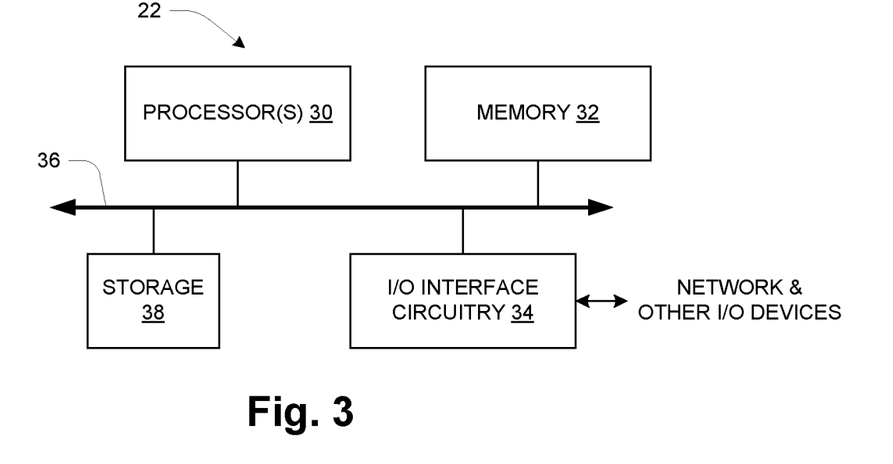
FIG. 3 is a hardware-oriented block diagram of a storage processor.

FIG. 3 shows an example configuration of a storage processor 22 from a computer hardware perspective. The hardware includes one or more processors 30, memory 32, and interface circuitry 34 interconnected together by data interconnections 36 such as one or more high-speed data buses. The interface circuitry 34 provides a hardware connections to the shared memory 24 and interfaces 20, 26 (FIG. 2) and perhaps other external devices/connections (EXT DEVs). The processor(s) 30 with connected memory 32 may also be referred to as "processing circuitry" herein. A storage processor 22 may also have its own local secondary storage 38 such as a Flash memory array. In operation, the memory 32 stores data and instructions of system software (e.g., operating system) and one or more application programs which are executed by the processor(s) 30 to cause the hardware to function in a software-defined manner.

Thus the computer hardware executing instructions of a data storage application, such as described below, can be referred to as a data storage circuit or data storage component, and it will be understood that a collection of such circuits or components can all be realized and interact with each other as one or more sets of computer processing hardware executing different computer programs as generally known in the art.

Figure 4:
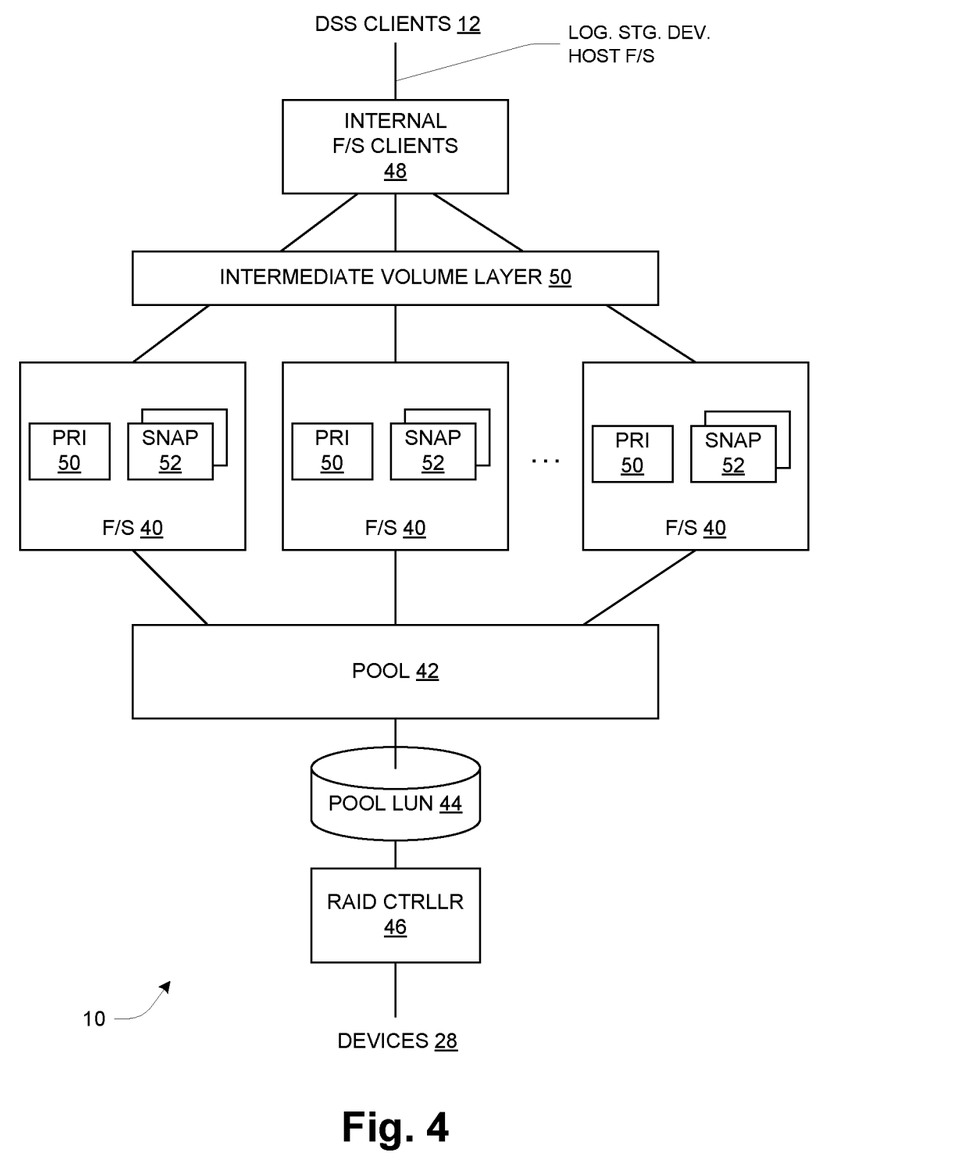
FIG. 4 is a functional block diagram of a data storage system.

FIG. 4 is a functional block diagram of the data storage system 10, the functional blocks generally being realized by execution of computer program instructions by the storage processor hardware as shown in FIG. 3. This description focuses on certain aspects of the functional structure and operation, specifically the use of one or more internal file systems (F/S) 40 which draw their underlying physical storage from the devices 28 via a certain organization as shown. This organization includes a pool 42 of data units called "slices" that are carved from an internal logical storage unit called a "pool LUN" 44, which in turn is presented by a RAID controller 46 implementing RAID over sets of the devices 28. Thus in general there may be a one-to-multiple mapping between the pool LUN 44 and corresponding devices 28 providing the RAID-protected underlying physical storage.

The internal file systems 40 are utilized by one or more internal file system clients 48 that present storage resources to the DSS clients 12. Examples of such presented resources include a logical storage device and a host file system as shown. An internal client 48 providing a host file system is referred to as a file-oriented internal client. A host-visible file system is referred to as an "upper" file system to distinguish it from the internal file system(s) 40, which are also referred to as "lower" file systems 40 herein. Logically interposed between the internal file system clients 48 and the lower file systems 40 is an intermediate logical volume layer 50 that presents logical volumes of storage to the internal file system clients 48. Each of these logical volumes, also referred to herein as "intermediate volumes", is stored in a respective file of a corresponding lower file system 40 and is referred to as a "volume file". Additionally, the data storage system 10 supports point-in-time copying of storage object data, with the copies being referred to as "snapshots" or "snaps". In this case, the object being copied may be referred to as the "primary" storage object and its snaps as "secondary" storage objects, and a given file system 40 hosts both the primary object as well as all its snaps. The primary object is typically the normal target of ongoing user I/O and thus the most up-to-date at any given time. A primary object is stored in a primary file 50, and secondary objects or snaps are stored in respective distinct snap or secondary volume files 52 of the given file system 40.

A snapshot is obtained by copying all the metadata of the file, including its Inode structure. The underlying data blocks are not copied. Rather, those blocks are now "shared" between the primary and the snapshot, i.e., both files point to the same set of blocks. As the primary continues to evolve during operation and its contents change, data blocks are added to and deleted from the primary as needed. As a simple example to illustrate, imagine that a primary contains blocks 1, 2 and 3 when a snapshot is taken. The snapshot thus contains blocks 1, 2 and 3 also, and all three blocks are shared. Later, block 2 is modified and block 3 is deleted in the primary. The new primary contents at that time are blocks 1 and 4, where 4 is an added block having the modified contents of original block 2. The snap continues to contain blocks 1, 2 and 3, and thus only block 1 in the primary remains shared.

Figure 5:
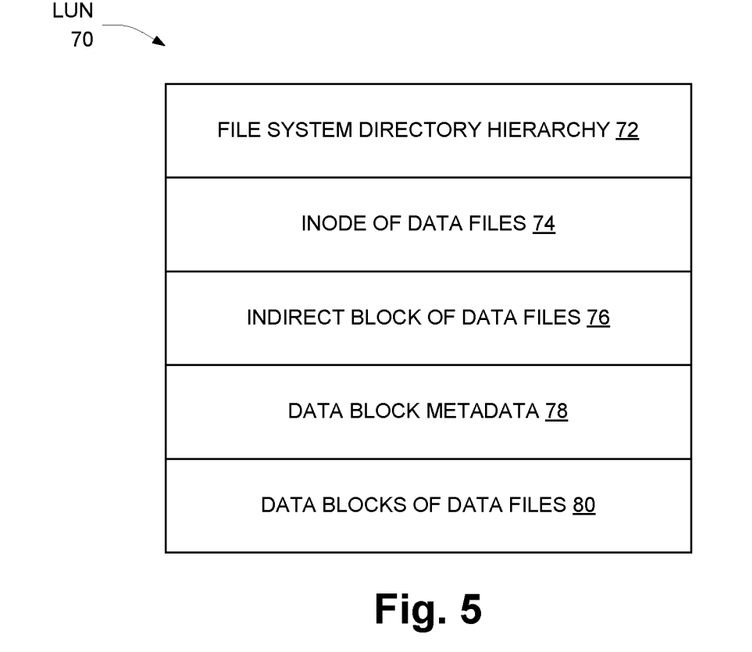
FIGS. 5-7 are schematic depictions of data structures.

FIG. 5 shows a logical representation of a LUN 70 presented to a host and organized within the data storage system 10 as a lower file system 40. A DSS client 12 accesses data from LUNs 70 stored on storage devices 28 in fixed sized chunks referred to as "slices". One or more slices are grouped together to create a slice pool 44. A host 12 provisions storage from the slice pool 42 for creating LUNs 70. A LUN 70 is visible to the host 12 and a user of a data storage system 10. Typically, storage is allocated when a host 12 issues a write request and a new data block is needed to write user data.

File systems typically include metadata describing attributes of a file system and data from a user of the file system. A file system contains a range of file system blocks that store metadata and data. A file system mapping driver allocates file system blocks from slices of storage for creating files and storing metadata of a file system. In at least some embodiments of the current technique, the file system block may be 8 kilobyte (KB) in size. Further, a user of data storage system 10 creates files in a file system. The file system is organized as a hierarchy. As shown in FIG. 5, at the top of the hierarchy is a listing of the directories 72 in the file system. Inodes of data files 74 depend from the file system directory hierarchy 72. Indirect blocks of data files 76 depend from the Inodes of the data files 74. Data block metadata 78 and data blocks of data files 80 depend from the Inodes of data files 74 and from the indirect blocks of data files 76.

Figure 6:
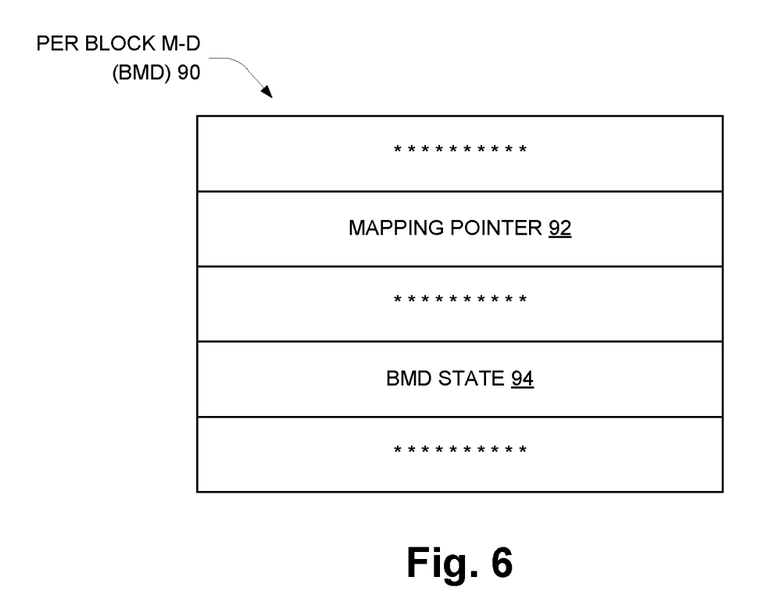

FIG. 6 shows a representation of a per block metadata (also referred to as "BMD") 90 for a file system data block. The per-block metadata 90 for a file system data block includes an Inode number of a file of the file system, the file system data block number (FSBN) and the logical offset of the file system data block, which are not shown. The per-block metadata 90 for a file system data block also includes an internal checksum (also not shown) protecting the integrity of the information stored in the per-block metadata 90. The per-block metadata for a file system data block may further include a mapping pointer 92 and a data structure indicating state of the per-block metadata, shown as BMD STATE 94.

Figure 7:
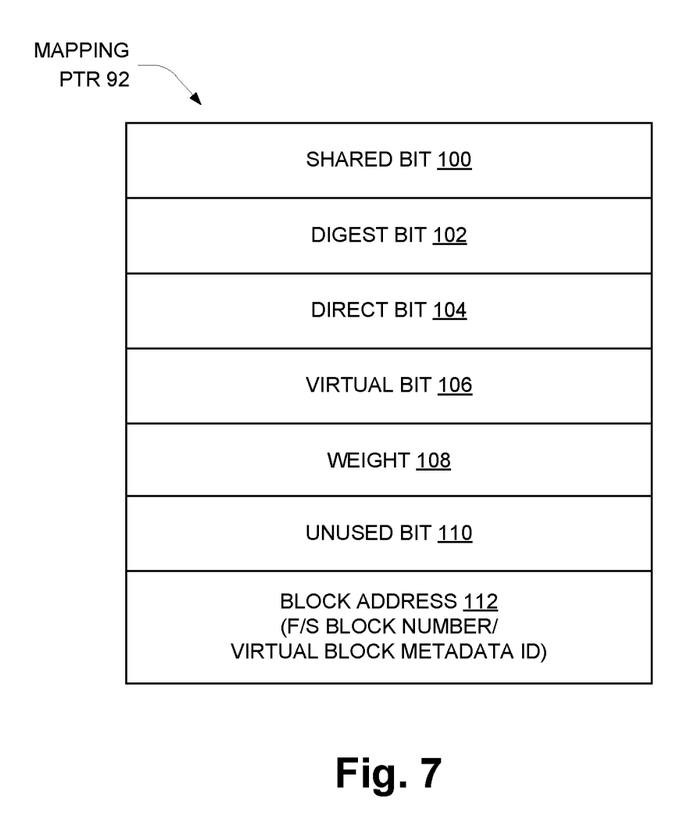

FIG. 7 shows a representation of a mapping pointer 92 of a file system data block. Each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block. Mapping pointer 92 includes metadata information such as a shared bit 100, a digest bit 102, a direct bit 104, a virtual bit 106, weight 108, an unused bit 110 and a block address 112. The shared bit 100 of mapping pointer 92 associated with a file system data block indicates whether the data block (or data blocks if the mapping pointer is associated with an indirect block) may be shared. The digest bit 102 of mapping pointer 92 for a file system block indicates whether the file system block has been digested by a deduplication engine. The direct bit 104 of mapping pointer 92 for a file system block indicates whether the physical address of the file system block can be computed algorithmically. The virtual bit 106 of mapping pointer 92 for a file system block indicates whether the mapping pointer is a virtual pointer. The weight 108 of mapping pointer 92 for a file system block indicates a delegated reference count for the mapping pointer 92. The delegated reference count is used by a snapshot copy facility when a replica of a file is created. Mapping pointers of the Inode of the file are copied and included in the Inode of the replica (snap) of the file.

In at least one embodiment, mapping pointers of the Inode may include mapping pointers pointing to direct data blocks and mapping pointers pointing to indirect blocks. Then, the delegated reference count values stored in the mapping pointers of the file and the replica of the file are updated to indicate that the file and the replica of the file share data blocks of the file. Unused bit 110 of mapping pointer 92 for a file system block indicates an unused space reserved for a future use. Block address 112 of mapping pointer 92 for a file system block indicates the block number of the file system block. Alternatively, block address 112 of mapping pointer 92 may indicate a Virtual Block Metadata ("VBM") identification number which points to a VBM object that points to a data block and includes metadata for the data block. Thus, the VBM identifier is used to find an object including virtual block metadata. Thus, a VBM object includes file system data block mapping pointer. It also includes a total distributed weight for the VBM object which is the sum of weights of each mapping pointer for a file system block pointing to the VBM object. The VBM object may further includes a mapping pointer which may point to a file system block or another VBM object such that the mapping pointer includes the distributed weight for the mapping pointer.

In response to a request by a DSS client 12 to create a snapshot copy of a production file, a virtual block mapping pointer is created that provides a mapping information to a logical block storing data of the file system block of the production file. The file system block includes a pointer pointing back to the metadata of the virtual block mapping pointer. Thus, a new kind of block pointer called virtual block mapping (VBM) pointer enables a migration or re-organization of data blocks to be performed in a non-disruptive fashion that is transparent to a file system manager because pointers to logical data blocks may be changed dynamically without having to change block pointers Inodes and indirect blocks pointing to the data blocks.

When a snapshot copy of a file is deleted, a portion of the file is truncated, or a portion of a snapshot copy of the file is truncated, each indirect block in a file system block hierarchy corresponding to a portion of a file or a snapshot copy of the file which is being deleted or truncated is evaluated such that a sibling indirect data block is determined for each indirect data block from file system hierarchies of snapshot copies of the file included in a version set to which the file belongs such that the indirect data block and the sibling indirect data block shares the most data blocks compared to other indirect data blocks in the file system hierarchies. Upon finding a sibling indirect data block for an indirect data block that has been selected for deletion, reference count for each shared data block pointed to by the indirect data block is returned to corresponding shared data block mapping pointer included in the sibling indirect data block instead of updating per-block metadata of each shared data block. It should be noted that an indirect data block may be selected from a file system hierarchy of a file when the file is deleted, the file is truncated, zeros are written to a portion of the file (also referred to as "punching a hole"), or data blocks are freed and returned to a storage device. Returning weight value for each shared data block pointed to by an indirect data block of a file to reference count values in a sibling indirect data block may also be referred to as "reverse indirect block split" operation as it operates in an opposite manner to a write split operation described above herein.

Generally, a delete or truncate operation for a file and/or snap of the file traverses a file system hierarchy for the file or the snap of the file in a top-down manner such that each indirect data block included in such file system hierarchy is traversed until each file system data block in each leaf indirect data block is evaluated. The processing of a leaf indirect data block includes processing each file system data block of the leaf indirect block where sharing status of each file system data block is evaluated. If a file system block of a snap processed for deletion is no longer referenced by any other active snaps, the file system block is deallocated and storage space associated with the file system block is freed. However, if a file system block of a snap processed for deletion is referenced by other active snaps, the file system block is not freed but metadata (e.g., delegated reference count) associated with the file system block is updated to decrement the reference to the file system data block.

Generally, the total distributed reference count value of a file system data block and a sharing status is maintained in per-block metadata of the file system data block. Typically, per-block metadata of a file system data block is either read from a cache or retrieved from a storage device if it does not reside in the cache to evaluate the sharing status of the file system data block. Further, in such a system, the delegated reference count value included in a mapping pointer of a file system data block is compared with the total distributed reference count value ("weight") stored in the per-block metadata.

In at least one embodiment of the current technique, sharing status of each file system data block included in a portion of file identified for deletion is evaluated to determine whether the file system data block can be freed if no other active snap refers to the file system data block. Upon determining that a file system block is "owned" indicating that the file system data block has not been shared by any other active snap and is only referenced by the file selected for deletion, the file system block may be deallocated and storage space associated with the file system data block may be reclaimed as free storage. Such file system block may also be referred to herein as uniquely allocated file system block. However, upon determining that a file system data block is "shared" indicating that the file system data block is either shared by more than one snap where one of the snap may not have been selected for deletion, the reference to the file system data is decremented by using the delegating reference counting mechanism.

Figure 8:
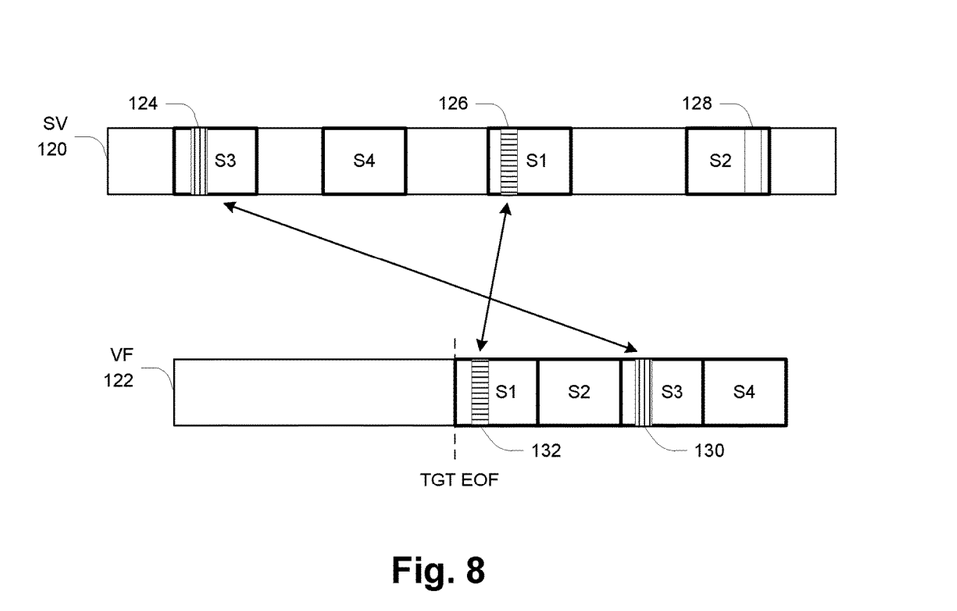
FIGS. 8-9 are schematic depictions of volumes and volume files.
Figure 9:
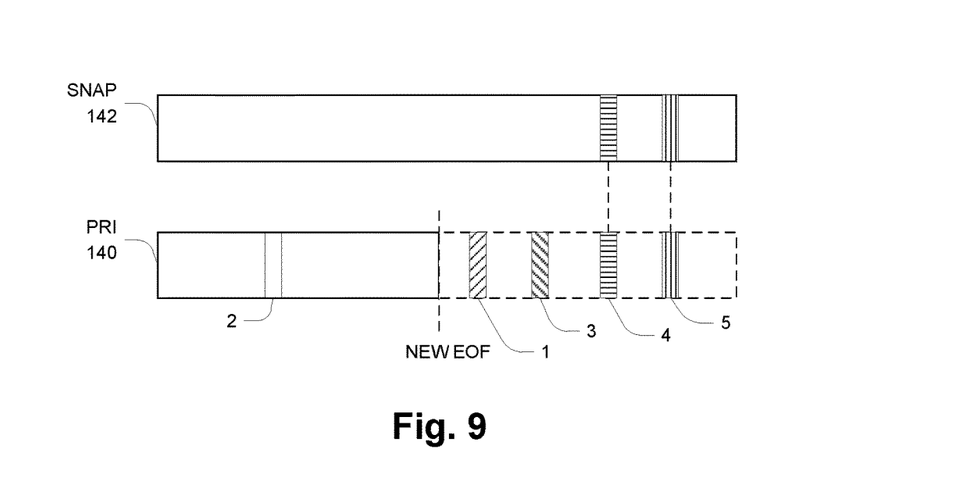

FIGS. 8-9 are used to illustrate a particular aspect of operation, namely a technique for approximating how much free space will be obtained when performing a storage reclaim from a file system 40 in the presence of snaps 52. Storage reclaim from the file system is about returning free space that is otherwise tied up to a file system instance back to the pool so that existing objects or new objects may benefit from it. Although the present description is directed to file systems storing snaps, the technique may have broader applicability to other environments in which blocks may be shared or otherwise not removable to create free space.

The lifecycle of the storage reclaim from a file system consists in reorganizing the upper file system to relocate any data and metadata blocks between the target end-of-file (EOF) and the present EOF so that there are no more file system blocks in use beyond the target EOF. The next step is to truncate the lower (volume) file supporting the upper file system to the target EOF, which will result in releasing any provisioned blocks. However, when the storage reclaim is taking place in the presence of snaps, not all the blocks beyond the target EOF will get released. This is due to the sharing of blocks. The approximation method is about providing a user with a hint on how much free space is likely to be returned back to the pool. Generally speaking, the method obtains counts of blocks of various types as pertaining to space reclaiming, and performs a calculation to obtain the desired approximation, which can be used by a higher-level process to decide whether or not to go ahead with shrinking the file system. There may be a threshold that represents a desired minimum level of shrinking to make the process worthwhile. File system shrinking consumes resources such as CPU cycles, I/O bandwidth, etc., and thus is preferably done only when the amount of space to be freed is worth the resource expenditure.

FIG. 8 shows a structure referred to as a "sparse volume" (SV) 120 and a corresponding volume file (VF) 122 of a lower file system 40. The sparse volume 120 is part of an internal file system client 48 and is a virtualized representation of storage space available to the upper file system, mapped onto the generally smaller physical space provided by the volume file 122 and its underlying physical storage. As an example, at a given time a volume file 122 may have a size on the order of gigabytes, while the sparse volume 120 may have an address space on the order of terabytes or even petabytes.

FIG. 8 shows blocks 124, 126 and 128 located in corresponding slices (S3, S1 and S2 respectively) of the sparse volume120. Blocks 124, 126 are mapped to corresponding blocks 130, 132 respectively of the volume file 122. All four slices are above the target (TGT) EOF, and thus are the slices that would be returned to the pool 42 if the volume file is truncated to the target EOF. So the question of how much space is freed turns in part on the number and types of blocks that populate these slices. Two extreme cases illustrate the issue. If all the blocks are free, then the amount of space that will be freed is the entire region—fours slices' worth of blocks. If all the blocks store in-use data that must be retained, and there is nowhere to move those blocks, then the amount of space that will be freed is zero.

More particularly, the blocks occupying the slices above the target EOF might fall into several categories, including categories for blocks shared with snaps. The following specific categories of blocks are pertinent:

1. Owned provisioned free block after target EOF
2. Owned provisioned free block before target EOF
3. Owned in-use block after target EOF
4. Shared provisioned free block beyond target EOF
5. Shared in-use data block after target EOF In the above, certain terms are used as follows:

Owned vs. shared—a block is owned if it is not shared, and a block is shared if it populates more than one file (e.g., a primary and a snap).

Free vs. in-use—a block is in-use if it stores current file data, and is otherwise free Provisioned (vs. reserved)—a block is provisioned if the pool 42 has given it to the file system for use in storing data. This is in contrast to blocks that may be reserved to a file system (and thus unavailable for use by other file systems) but still logically residing in the pool 42 rather than having been given to the file system for use.

FIG. 9 is used to illustrate the above. Each example block in a primary (PRI) volume file140 is tagged with a category number. A snap (SNAP) or secondary volume file 142 is also shown that shares two blocks (indicated by dashed vertical lines) with the primary volume file 140.

Generally, the amount of space to be freed can be approximated as a difference between the number of blocks of type 1 or 3 (owned blocks after the target EOF) minus a value that expresses an excess of blocks of types 3 or 5 (in-use blocks after the target EOF) over the number of blocks of type 2 (free blocks before the target EOF). The latter value accounts for blocks after the target EOF that cannot be relocated to before the target EOF, i.e., for which there are no additional free blocks before the target EOF to which those blocks can be moved.

More particularly, the following calculation may be used to approximate the amount of space that can be freed by truncation to the target EOF:

Space approx.=(# type 1)+(# type 3)−IF{[(# type 3)+(# type 5)]−(# type 2)}, where "#" refers to the number of blocks of the specified type, and IF is a conditional function returning the argument if it is non-negative, and otherwise returning zero. The IF part of the above equation accounts for blocks that cannot be relocated due to a shortage of type-2 blocks to which they can be moved.

Once the approximation has been obtained, it can be used in a decision whether to proceed with the truncation of the volume file, which as mentioned above is a cost-benefit question of whether the amount of space to be freed is worth the expenditure of resources. For this decision some type of threshold may be used, and the type of threshold may differ in different embodiments and perhaps even under different circumstances in a given implementation. For example, the threshold may be an absolute value, i.e., a predetermined number of bytes of storage that must be obtained. Alternatively, it may be a proportional or relative value, such as some particular proportion of the difference between the current EOF and the target EOF. In the illustrated example of four slices above the target EOF, an example threshold might be three slices, i.e., it is required that at least three slices' worth of space will be freed as a condition to proceeding with the truncation. It will be appreciated that the actual new EOF resulting from truncation may be different from the target EOF used in the above-described process of approximating the amount of free space to be obtained. In particular, the new EOF might be after the target EOF if the decision threshold is smaller than the difference between the current EOF and the target EOF.

Referring again to FIG. 8, the relationships represented by the arrows extending between the sparse volume 120 and the volume file 122 may be used to identify the categories of the blocks that occupy the volume file 122 for the above-described approximation method. The blocks of the volume file 122 can be reverse-mapped to the upper file system to identify whether they are free, provisioned free, or allocated (in-use). For allocated and provisioned blocks, it is necessary to determine whether they are owned or shared. This can be done by resolving the block to the FSBN in the volume file 122 and reading the BMD. If the weight of the mapping pointer is equal to the weight in the BMD, then the block is owned, and otherwise it is shared.

Figure 10:
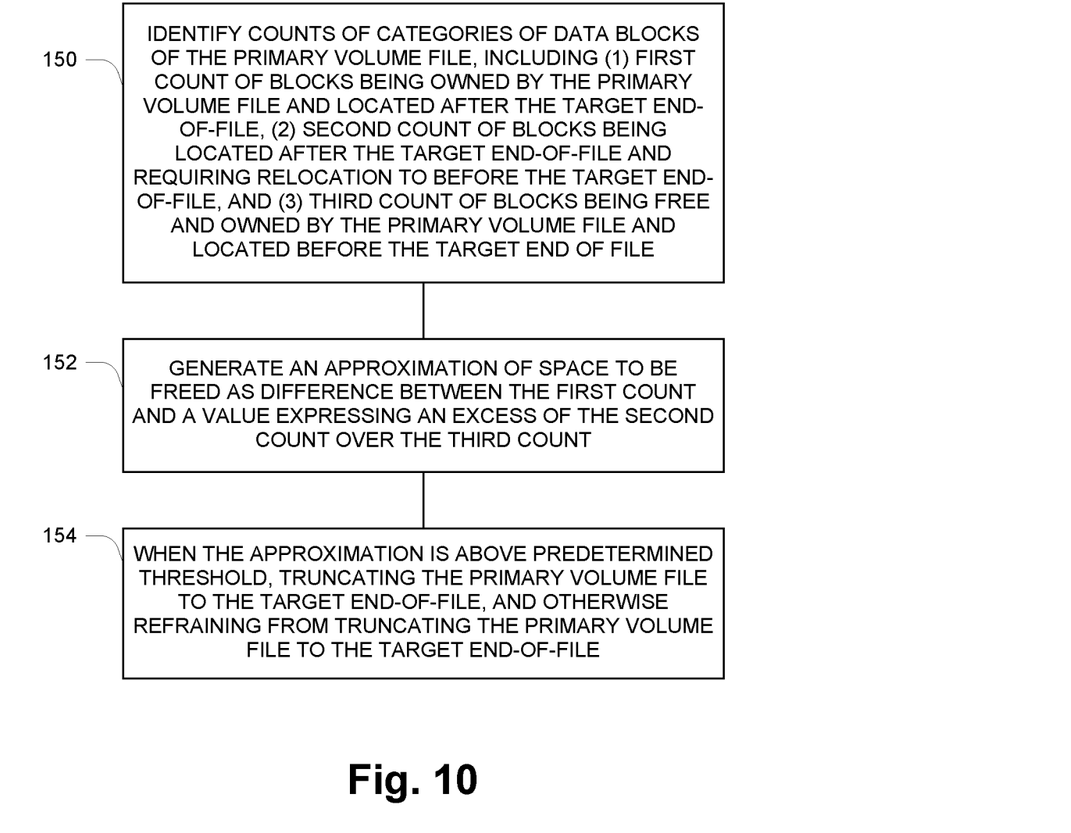
FIG. 10 is a flow diagram of a process of conditionally truncating a volume file.

FIG. 10 describes pertinent operation of the data storage system 10 in flow diagram format.

At 150, respective counts of categories of data blocks of the primary volume file are identified, including (1) a first count of blocks being owned by the primary volume file and located after the target end-of-file, (2) a second count of blocks being located after the target end-of-file and requiring relocation to before the target end-of-file, and (3) a third count of blocks being free and owned by the primary volume file and located before the target end-of-file.

At 152, an approximation is generated of space to be freed as a difference between the first count and a value expressing an excess of the second count over the third count. In the embodiment described above, this value is the IF term of the approximation equation.

At 154, when the approximation is above a predetermined threshold, then the primary volume file is truncated to the target end-of-file, and otherwise truncation is refraining from. While this description focuses on the threshold alone, there may be other factors that influence the decision, and this description of the use of the threshold is not necessarily limiting.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage system having physical storage devices and one or more storage processors executing computer program instructions, comprising:
    defining an upper file system, a lower file system, and an intermediate logical volume, the intermediate logical volume viewed as an underlying storage volume by the upper file system and stored as a set of volume files of the lower file system, the volume files including a primary volume file for a current version of the storage volume and one or more secondary volume files for snapshot copies of the storage volume at past points in time, the method directed to conditionally truncating the primary volume file to a target end-of-file based upon an approximation of an amount of storage space to be returned to an underlying storage pool;
    identifying respective counts of categories of data blocks of the primary volume file, including (1) a first count of blocks being owned by the primary volume file and located after the target end-of-file, (2) a second count of blocks being located after the target end-of-file and requiring relocation to before the target end-of-file, and (3) a third count of blocks being free and owned by the primary volume file and located before the target end-of-file;
    generating an approximation of space to be freed as a difference between the first count and a value expressing an excess of the second count over the third count; and
    when the approximation is above a predetermined threshold, then truncating the primary volume file to the target end-of-file, and otherwise refraining from truncating the primary volume file to the target end-of-file.

2. The method of claim 1, wherein the first count of blocks includes a count of free owned blocks and a count of in-use owned blocks, and the second count of blocks includes the count of in-use owned blocks and a count of in-use shared blocks shared with one or more of the snapshot copies of the storage volume.

3. The method of claim 1, wherein the second count of blocks includes a count of in-use owned blocks and a count of in-use shared blocks shared with one or more of the snapshot copes of the storage volume, and the first count of blocks includes a count of free owned blocks and the count of in-use owned blocks.

4. The method of claim 1, wherein the value expressing an excess of the second count over the third count is calculated by a conditional function returning a difference between the second count and the third count if the difference is non-negative, and returning zero otherwise.

5. The method of claim 1, wherein the identifying the respective counts includes reverse-mapping blocks of the primary volume file to the upper file system to identify whether the blocks are free or in-use.

6. The method of claim 1, wherein the identifying the respective counts includes (a) resolving each block to a block number in the primary volume file and reading block metadata of the block, (b) comparing a weight value from the block metadata to a weight value from a mapping pointer for the block, and (c) identifying the block as owned when the weight value of the mapping pointer is equal to the weight value in the block metadata, and otherwise identifying the block as shared.

7. A data storage system, comprising:
    physical storage devices;
    respective interfaces to the physical storage devices and to a network via which client storage requests are received; and
    one or more storage processors coupled to the physical storage devices and to the network via the respective interfaces, the storage processors configured and operative to perform a method including:
    defining an upper file system, a lower file system, and an intermediate logical volume, the intermediate logical volume viewed as an underlying storage volume by the upper file system and stored as a set of volume files of the lower file system, the volume files including a primary volume file for a current version of the storage volume and one or more secondary volume files for snapshot copies of the storage volume at past points in time, the method directed to conditionally truncating the primary volume file to a target end-of-file based upon an approximation of an amount of storage space to be returned to an underlying storage pool;
    identifying respective counts of categories of data blocks of the primary volume file, including (1) a first count of blocks being owned by the primary volume file and located after the target end-of-file, (2) a second count of blocks being located after the target end-of-file and requiring relocation to before the target end-of-file, and (3) a third count of blocks being free and owned by the primary volume file and located before the target end-of-file;
    generating an approximation of space to be freed as a difference between the first count and a value expressing an excess of the second count over the third count; and
    when the approximation is above a predetermined threshold, then truncating the primary volume file to the target end-of-file, and otherwise refraining from truncating the primary volume file to the target end-of-file.

8. The data storage system of claim 7, wherein the first count of blocks includes a count of free owned blocks and a count of in-use owned blocks, and the second count of blocks includes the count of in-use owned blocks and a count of in-use shared blocks shared with one or more of the snapshot copies of the storage volume.

9. The data storage system of claim 7, wherein the second count of blocks includes a count of in-use owned blocks and a count of in-use shared blocks shared with one or more of the snapshot copes of the storage volume, and the first count of blocks includes a count of free owned blocks and the count of in-use owned blocks.

10. The data storage system of claim 7, wherein the value expressing an excess of the second count over the third count is calculated by a conditional function returning a difference between the second count and the third count if the difference is non-negative, and returning zero otherwise.

11. The data storage system claim 7, wherein the identifying the respective counts includes reverse-mapping blocks of the primary volume file to the upper file system to identify whether the blocks are free or in-use.

12. The data storage system of claim 7, wherein the identifying the respective counts includes (a) resolving each block to a block number in the primary volume file and reading block metadata of the block, (b) comparing a weight value from the block metadata to a weight value from mapping pointer for the block, and (c) identifying the block as owned when the weight value in the block metadata, and otherwise identifying the block as shared.

13. A non-transitory computer-readable medium storing computer program instructions, the instructions being executable by a set of one or more storage processors of a data storage system to cause the data storage system to perform a method including:
  defining an upper file system, a lower file system, and an intermediate logical volume, the intermediate logical volume viewed as an underlying storage volume by the upper file system and stored as a set of volume files of the lower file system, the volume files including a primary volume file for a current version of the storage volume and one or more secondary volume files for snapshot copies of the storage volume at past points in time, the method directed to conditionally truncating the primary volume file to a target end-of-file based upon an approximation of an amount of storage space to be returned to an underlying storage pool;
  identifying respective counts of categories of data blocks of the primary volume file, including (1) a first count of blocks being owned by the primary volume file and located after the target end-of-file, (2) a second count of blocks being located after the target end-of-file and requiring relocation to before the target end-of-file, and (3) a third count of blocks being free and owned by the primary volume file and located before the target end-of-file;
  generating an approximation of space to be freed as a difference between the first count and a value expressing an excess of the second count over the third count; and
  when the approximation is above a predetermined threshold, then truncating the primary volume file to the target end-of-file, and otherwise refraining from truncating the primary volume file to the target end-of-file.

14. The non-transitory computer-readable medium of claim 13, wherein the first count of blocks includes a count of free owned blocks and a count of in-use owned blocks, and the second count of blocks includes the count of in-use owned blocks and a count of in-use shared blocks shared with one or more of the snapshot copies of the storage volume.

15. The non-transitory computer-readable medium of claim 13, wherein the second count of blocks includes a count of in-use owned blocks and a count of in-use shared blocks shared with one or more of the snapshot copes of the storage volume, and the first count of blocks includes a count of free owned blocks and the count of in-use owned blocks.

16. The non-transitory computer-readable medium of claim 13, wherein the value expressing an excess of the second count over the third count is calculated by a conditional function returning a difference between the second count and the third count if the difference is non-negative, and returning zero otherwise.

17. The non-transitory computer-readable medium of claim 13, wherein the identifying the respective counts includes reverse-mapping blocks of the primary volume file to the upper file system to identify whether the blocks are free or in-use.

18. The non-transitory computer-readable medium of claim 13, wherein the identifying the respective counts includes (a) resolving each block to a block number in the primary volume file and reading block metadata of the block, (b) comparing a weight value from the block metadata to a weight value from a mapping pointer for the block, and (c) identifying the block as owned when the weight value of the mapping pointer is equal to the weight value in the block metadata, and otherwise identifying the block as shared.

* * * * *

UNITED STATES PATENT AND TRADEMARK OFFICE
CERTIFICATE OF CORRECTION

| | | |
|---|---|---|
| PATENT NO. | : 10,007,671 B1 | Page 1 of 1 |
| APPLICATION NO. | : 15/085289 | |
| DATED | : June 26, 2018 | |
| INVENTOR(S) | : Jean-Pierre Bono et al. | |

It is certified that error appears in the above-identified patent and that said Letters Patent is hereby corrected as shown below:

In the Claims

Column 11, Line 10 Claim 12 should read:
"12. The data storage system of claim 7, wherein the identifying the respective counts includes (a) resolving each block to a block number in the primary volume file and reading block metadata of the block, (b) comparing a weight value from the block metadata to a weight value from a mapping pointer for the block, and (c) identifying the block as owned when the weight value of the mapping pointer is equal to the weight value in the block metadata, and otherwise identifying the block as shared."

Signed and Sealed this
Twenty-eighth Day of May, 2019

Andrei Iancu
*Director of the United States Patent and Trademark Office*